US008293091B2

(12) United States Patent
Munson et al.

(10) Patent No.: US 8,293,091 B2
(45) Date of Patent: Oct. 23, 2012

(54) ELECTRICALLY ENHANCED CELLULOSE FILTRATION SYSTEM

(75) Inventors: Gerald L. Munson, Madison, CT (US); David M. Butler, Loudon, TN (US); Daniel P. McCormick, Turner, ME (US)

(73) Assignee: McCormick and Munson Technologies, LLC, Madison, CT (US)

( * ) Notice: Subject to any disclaimer, the term of this patent is extended or adjusted under 35 U.S.C. 154(b) by 394 days.

(21) Appl. No.: 12/492,840

(22) Filed: Jun. 26, 2009

(65) Prior Publication Data

US 2010/0326831 A1 Dec. 30, 2010

(51) Int. Cl.

| | |
|---|---|
| ***B01D 35/06*** | (2006.01) |
| ***B01D 39/04*** | (2006.01) |
| ***C10G 32/02*** | (2006.01) |
| ***C10G 33/02*** | (2006.01) |
| ***C02F 1/48*** | (2006.01) |

(52) U.S. Cl. ........ 204/665; 204/660; 204/661; 204/666; 204/554; 204/571; 210/748.01; 210/500.29; 210/428

(58) Field of Classification Search .................. 204/555, 204/660–674; 205/554–573; 210/243
See application file for complete search history.

(56) References Cited

U.S. PATENT DOCUMENTS

| | | | | |
|---|---|---|---|---|
| 3,324,026 | A | 6/1967 | Waterman et al. | |
| 3,445,376 | A | 5/1969 | Stenzel | |
| 4,347,110 | A * | 8/1982 | Joyce et al. | 204/514 |
| 4,579,657 | A | 4/1986 | Hood, Jr. | |
| 4,594,138 | A | 6/1986 | Thompson | |
| 4,601,799 | A | 7/1986 | Froberger et al. | |
| 4,620,917 | A | 11/1986 | Nozawa et al. | |
| 4,800,011 | A | 1/1989 | Abbott et al. | |
| 4,806,204 | A * | 2/1989 | Manfre et al. | 162/106 |
| 4,941,962 | A | 7/1990 | Inoue | |
| 5,630,926 | A | 5/1997 | Thompson | |
| 5,785,834 | A | 7/1998 | Thompson | |
| 5,788,827 | A | 8/1998 | Munson | |
| 6,129,829 | A * | 10/2000 | Thompson | 204/665 |
| 6,576,107 | B2 | 6/2003 | Thompson | |
| 7,377,957 | B2 | 5/2008 | Rosenberg | |
| 2010/0072141 | A1 * | 3/2010 | Lopes | 210/695 |

OTHER PUBLICATIONS

Generation Problem of Static Electricity During Oil Filtration, Akira Sasaki, Kleentek Ind. Co., Ltd., Tokyo Japan; I00-9.9; pp. 293-300.

Production of Free Radicals and Oil Auto-Oxidation Due to Spark Discharges of Static Electricity, Akira Sasaki, and Dr. Shinji Ulchiyama, Kleentek Ind. Co., Ltd., Tokyo, Japan; NFPA, I00-9.13; pp. 327-331.

Effect of Oil Quality on Electrostatic Charge Generation and Transport, T. J. Harvey, R. J. K. Wood, G. Denault, H. E. G. Powrie, University of Southampton, Hampshire, UK; Journal of Electrostatics 55 (2002); pp. 1-23.

Monitoring and Optimizing the Life of Turbine Oils, Analysts, Inc.; Rev. Oct. 18, 2005; pp. 1-12.

* cited by examiner

*Primary Examiner* — Jonathan Johnson
*Assistant Examiner* — Brian W Cohen
(74) *Attorney, Agent, or Firm* — DeLio & Peterson, LLC; Kelly M. Nowak

(57) ABSTRACT

Electrostatic filters, systems and methods having separate positively and negatively charged filter elements within electrically isolated filter tanks for electrostatically filtering particles from a fluid flow. Both positive charged connections biased to earth ground and negative charged connections biased to earth ground are made to the respective positive and negative charged filter elements, along with triboelectric induced charge accumulations from the fluid flow, for separating charged particles within the fluid flowing parallel through these oppositely charged filter elements. Variable resistors of a power supply connected to such filters, systems and methods provide for controlling and adjusting for any undesired voltage excesses and/or shortfalls within these filter tanks so that the fluid flowing exiting these filter tanks is unbiased to generate a filtered fluid having balanced electrostatic charges.

20 Claims, 8 Drawing Sheets

ELECTRICALLY ENHANCED CELLULOSE FILTRATION SYSTEM

BACKGROUND OF THE INVENTION

1. Field of the Invention

The present invention relates generally to electrostatic filtering systems, and in particular, to electrostatic filtering systems for collecting and removing fine, particulate matter from hydraulic fluids, and other insulating and/or dielectric fluids.

2. Description of Related Art

Many mechanical and electrostatic filters exist for removing contaminants from oils, hydraulic fluids, insulating and other insulating and/or dielectric fluids. These contaminants include ions, moisture, molecular impurities and particulate matter within such fluids. In purely mechanical filtration systems, a fluid flow passes through one or more filter materials, whereby these filters trap and remove contaminants from the fluid flow. However, since very fine particulate matter, such as particulate matter having dimensions of less than about 3 to 5 microns, passes directly through the larger size pores of the mechanical filter medium, these types of systems are not efficient in trapping and removing such fine particulate matter. Another problem associated with mechanical filtration systems is that the small particle size of the contaminants requires large bulk and volume filters to avoid excessive pressure drop caused by the smaller openings in the filter media.

As an alternative to mechanical filtration systems, electrostatic filters have been implemented to remove fine particles by passing the contaminated fluid over or through a plurality of perforated electrodes, which are alternately charged positive and negative. In some of the known electrostatic filters, porous filter media is placed between the electrodes for trapping the particulates and extend across the entire internal cross-sectional area of the filter. Filtration in these types of systems is achieved by the generation of an electric field between adjacent electrodes to charge the filter media and attract the particulate matter to such charged filter media. Alternatively, the particulate matter is charged positive or negative so that oppositely charged particles attract to each other and floc into clumps (i.e., flocculate). Filter media then mechanically filters out these clumps or flocs from the fluid flow. When enough clumps form to effectively block the filter or produce an undesirable pressure drop, the filter media must be replaced.

Electrostatic filters of this type are shown in U.S. Pat. No. 4,594,138 issued Jun. 10, 1986 to Donald E. Thompson, U.S. Pat. No. 5,332,485 issued Jul. 26, 1994 to Donald E. Thompson, U.S. Pat. No. 5,630,926 issued May 20, 1997 to Donald E. Thompson, U.S. Pat. No. 5,785,834 issued Jul. 28, 1998 to Donald E. Thompson, U.S. Pat. No. 6,129,829, issued Oct. 10, 2000 to Donald E. Thompson, U.S. Pat. No. 6,284,118, issued Sep. 4, 2001 to Donald E. Thompson, and U.S. Pat. No. 6,576,107, issued Jun. 10, 2003 to Donald E. Thompson.

These patents generally disclose contaminated fluid flowing axially through a filter, whereby layers of filter media separate perforated electrodes in a single filter element. The perforated electrodes are alternately oppositely charged, with the filtration process taking place by flowing the contaminated fluid upwardly through perforations in the electrodes and the filter media between the plates in this single element. These patents also disclose electrostatic charging of the particles within the fluid as a result of direct electrical connection of a power supply to the perforated electrodes within the filter element to generate electric fields therein that are imposed upon the fluid flow and/or the filter media. The fluid flows through these electric field inside the filter element, before or during flow of the fluid through the adsorbent material, whereby charged particles and large sized particles (i.e., those having diameters up to about 254 microns) are able to flow directly through the large openings in the filter media and out the filter. Those particles exiting the filter agglomerate with oppositely charged particles, whereby these agglomerates are then mechanically filtered out of the fluid flow in another element having filter media.

Accordingly, while perforated electrostatic filters may be effective to a certain extent, they have certain drawbacks and inefficiencies, as discussed above. Additionally, perforated electrostatic filters have limited amounts of surface area for filtration, and as such, if water or other contaminants reach a level sufficient to permit short circuits between the perforated electrodes, or plug the filter media, the filter is rendered less effective or even useless.

These types of filters also do not adequately solve the hydraulic problems attributable to particulate contaminants having dimensions of less than about 3 to 5 microns in diameter. Many modern oils, hydraulic fluids, and other insulating and/or dielectric fluids generate static electricity as a result of the friction of the fluid flowing through the filter system. Accumulation of this static electricity leads to spark discharge, which deleteriously causes the contamination problems of both very fine charged particles and oxidation of the fluid. Current electrostatic filters are not effective in trapping and removing such fine particulate matter from the fluid flow.

Therefore, a need continues to exist to have improved electrostatic filter systems for removing very fine particulate contaminants from hydraulic fluid and other insulating fluids, and in particular, to systems that are effective in eliminating the hydraulic problems associated with sub micron contaminant particles. Accordingly, a continuing effort has been directed to the development of improved electrostatic filters.

SUMMARY OF THE INVENTION

Bearing in mind the problems and deficiencies of the prior art, it is therefore an object of the present invention to provide improved, electrostatic filter systems for removing particulate contaminants from oils, hydraulic fluids, and other insulating and/or dielectric fluids.

It is another object of the present invention to provide electrostatic filter systems for effectively removing very fine particulate matter at an extremely high efficiency so as to effectively clean the insulating and/or dielectric fluids.

A further object of the invention is to provide electrostatic filter systems that can be constructed in a variety of forms for use in numerous differing fluid systems, such as hydraulic and other insulating and/or dielectric fluid systems, lubrication systems, and the like in vehicles or machinery.

Another object of the present invention is to provide electrostatic filter systems that are of substantially simple structure and function, and which are, easy and safe to handle and use, dependable, economical, durable and fully effective in accomplishing its intended purposes.

It is yet another object of the present invention to provide electrostatic filter systems adaptable for quick and easy attachment to the components of an existing fluid to facilitate the replacement of a used filter by a new one.

Still other objects and advantages of the invention will in part be obvious and will in part be apparent from the specification.

The above and other objects, which will be apparent to those skilled in the art, are achieved in the present invention which is directed to in a first aspect electrostatic filters having a fluid flow therein, whereby such filters at least include a first filter tank containing a positively charged filter element and a second filter tank containing a negatively charged filter element that is electrically isolated from the positively charged filter element. The positively charged electrical connector is biased to earth ground and is in direct contact with the positively charged filter element, thereby providing and controlling positive charges thereto. In a similar manner, the negatively charged electrical connector is biased to earth ground and is in direct contact with the negatively charged filter element, thereby providing and controlling negative charges thereto. An electrical connection resides between an external power source and the positively and negatively charged electrical connectors for monitoring and adjusting voltages applied to the positively and negatively charged filter elements, and result in an unbiased fluid flow from such first and second filter tanks.

In another aspect, the invention is directed to electrostatic filter systems for removing particles from a fluid. The systems of the invention at least include a power supply having an earth grounded positive voltage control and an earth grounded negative voltage control. The systems also include a first filter tank containing one or more positively charged filter elements, and a second filter tank containing one or more negatively charged filter elements that are electrically isolated from the one or more positively charged filter elements. In these systems, one or more positively charged connectors that are biased to earth ground are in direct contact with and between the positive control voltage of the power supply and the one or more positively charged filter elements. These positively charged connectors control positive charges to the positively charged filter elements. Similarly, one or more negatively charged connectors that are biased to earth ground are in direct contact with and between the negative control voltage of the power supply and the one or more negatively charged filter elements, whereby these negatively charged connectors control negative charges to the negatively charged filter elements. In the systems of the invention, resistors of the power supply monitor and adjust voltages applied to the one or more positively and negatively charged filter elements for generating a resultant unbiased fluid flow from the first and second filter tanks.

In still another aspect, the invention is directed to methods of electrostatic filtering particles from a fluid. These methods at least include providing a power supply having an earth grounded positive voltage control and an earth grounded negative voltage control. Also provided are a first filter tank containing one or more filter elements and an electrically isolated second filter tank containing one or more filter elements. At least one positively charged connector and at least one negatively charged connector are connected respectively between the earth grounded positive voltage control and the filter elements in the first filter tank, and the earth grounded negative voltage control and the filter elements within the second tank. A positive voltage is applied to the first tank and a negative voltage applied to the second tank to respectively generate positively charged filter elements within the first tank and negatively charged filter elements within the second tank. Equal volumes of fluid then flow simultaneously through the one or more positively and negatively charged filter elements, whereby triboelectric charges accumulate on the positively charged filter elements within the first filter tank to increase the positively charged state thereof, and accumulate on the negatively charged filter elements within the second filter tank to increase the negatively charged state thereof. Oppositely charged particles are then removed from the fluid flow through the positively and negatively charged filter elements, while the accumulation of positive and negative voltages within the first and second filter tanks is controlled by the power supply. In doing so, an unbiased fluid flow is output from the first and second filter tanks.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5B of the drawings in which like numerals refer to like features of the invention.

The present invention is directed to methods, apparatus and systems for removing contaminants from oils, lubricating fluids, hydraulic fluids, and other insulating and/or dielectric fluids using an electrically enhanced cellulose filter and system. These contaminants may be very fine solids and/or oxidative semi-solid polar or charge material, having diameters at least as small as about 3-5 microns, or even smaller. The one or more embodiments of the invention use induced charge separation to separate charges within fluid flowing parallel through oppositely charged filter media in electrically isolated filter tanks, so that charges that are the same polarity as the bias on the filter media pass through each respective filter tank unaffected. The invention provides for controlling and adjusting for any undesired voltage excesses and/or shortfalls within these electrically isolated filter tanks so that the fluid flowing exiting these filter tanks is unbiased to generate a filtered fluid having balanced electrostatic charges.

Figure 1:
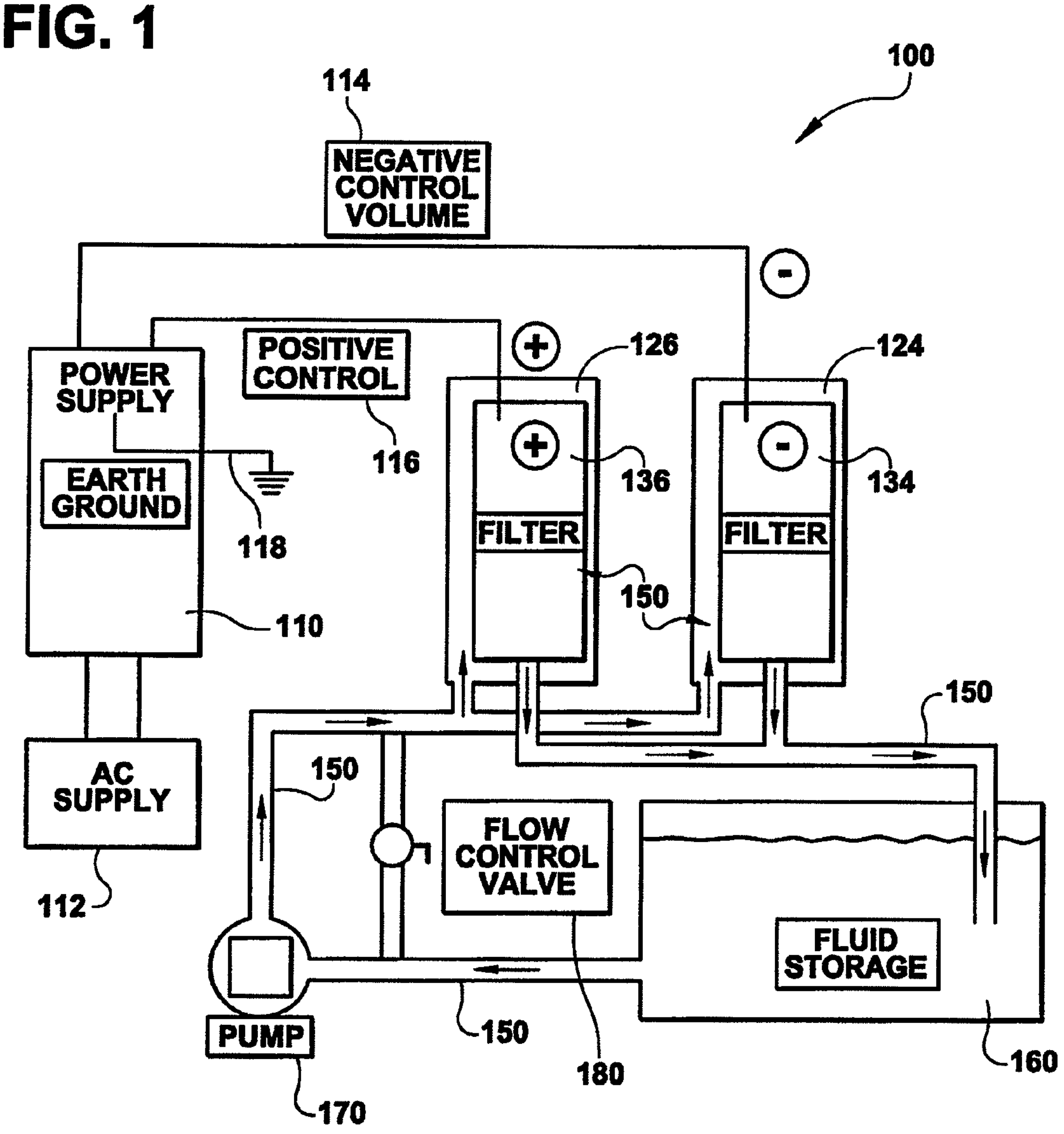
FIG. 1 shows a schematic showing the component parts of an electrically enhanced cellulose filter system in accordance with the present invention.

Referring to the drawings, FIG. 1 illustrates an electrically enhanced filter system 100 in accordance with one or more embodiments of the invention. As shown, the systems of the invention include a fluid storage 160 tank for fluid retention, a flow control valve 180, pump 170, insulated piping 150, a positively charged filter tank 126 and a negatively charged filter tank 124. These positively and negatively charged filter tanks 126 and 124 are separated and electrically isolated from one another via insulated piping. The systems 100 also include an AC supply 112 connected to a four quadrant power supply 110. The power supply 110 has a negative voltage 114 control line, a positive voltage 116 control line, and an earth grounded 118 line so that the power supply is earth grounded. This four quadrant power supply 110 also includes variable resistors in the load return lines. These variable resistors detect and measure current in the two filter tanks 126 and 124 and feedback this data to the power supply. The power supply then uses this feedback data to adjust and control the positive and negative output voltages that are applied, respectively, to the positively charged filter tank 126 and the negatively charged filter tank 124. In accordance with the various embodiments of the invention, these positive and negative output voltages are adjusted and controlled simultaneously, preferably at equally adjusted opposite charges, so that the fluid flowing through the charged filter tanks 126 and 124 are processed and filtered under equivalent operating conditions that are oppositely charged from each other.

In accordance with one or more embodiments of filtering a fluid using the present electrically enhanced filter systems 100, the power supply 110 is turned on and the flow control valve 180 opened, whereby pump 170 moves the fluid flow from the fluid storage 160 tank and through insulated piping 150 of the system. As the fluid flow approaches the charged filter tanks 126 and 124, such fluid flow is simultaneously split into the positively charged filter tank 126 and the negatively charged filter tank 124 so that equal volumes of fluid enter each tank at the same rate. The first filter tank 126 of the present electrically enhanced filter systems 100 includes one or more positively charged filter elements 136, each of which is positively charged with respect to earth ground, via power supply 110, positive voltage control 116 and earth ground 118. In a similar fashion, the second filter tank 124 includes one or more negatively charged filter elements 134, each of which is negatively charged with respect to earth ground. Once the fluid flow is within the two filter tanks 126 and 124, it simultaneously enters one or more positively charged filter element(s) 136 within filter tank 126 and one or more negatively charged filter element(s) 134 within tank 124. The plurality of arrows in FIG. 1 depict the fluid flow through one or more embodiments of the invention.

Figure 2A:
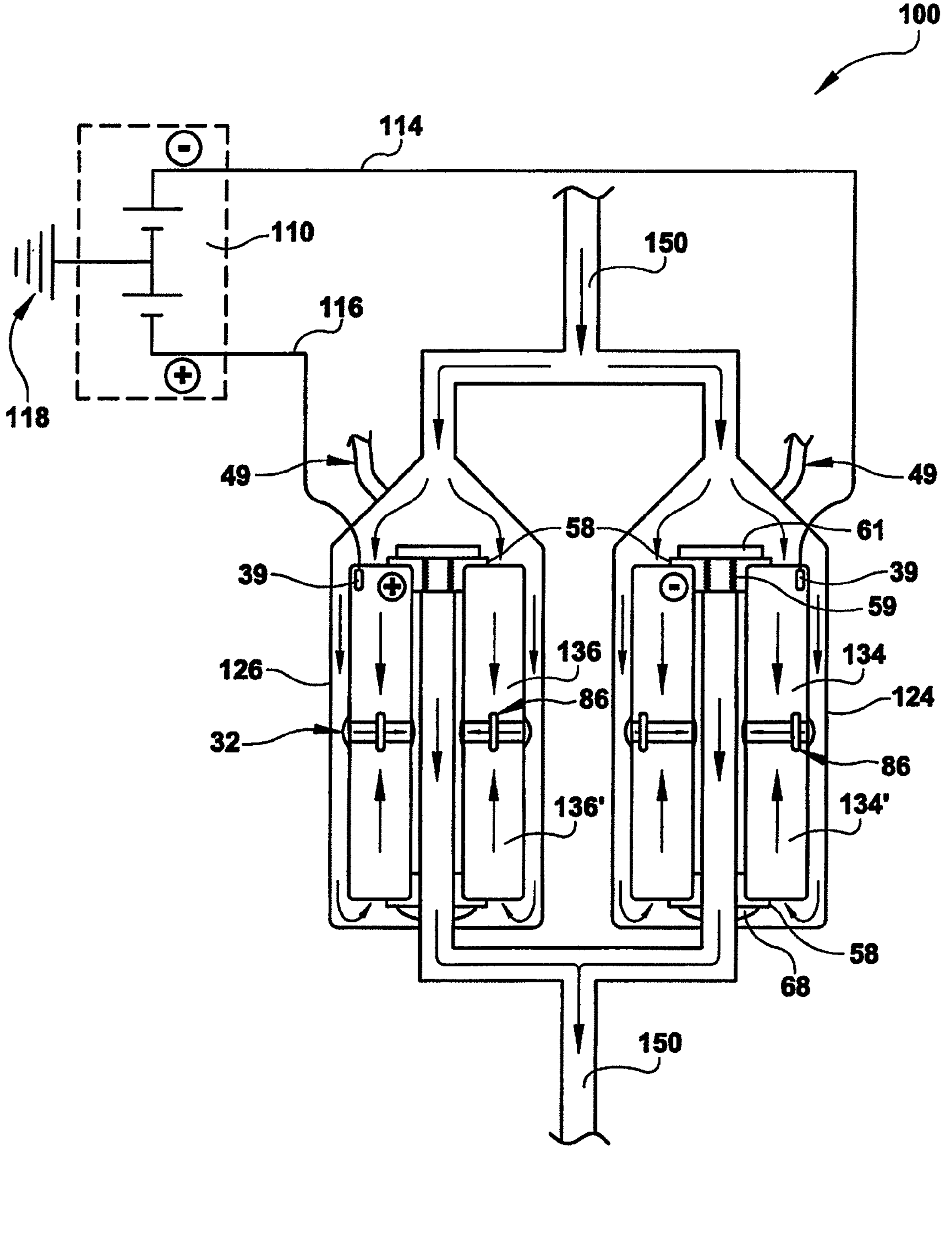
FIGS. 2A-C show cross sectional view of an electrically enhanced cellulose filter system in accordance with one or more embodiments of the invention.
Figure 2B:
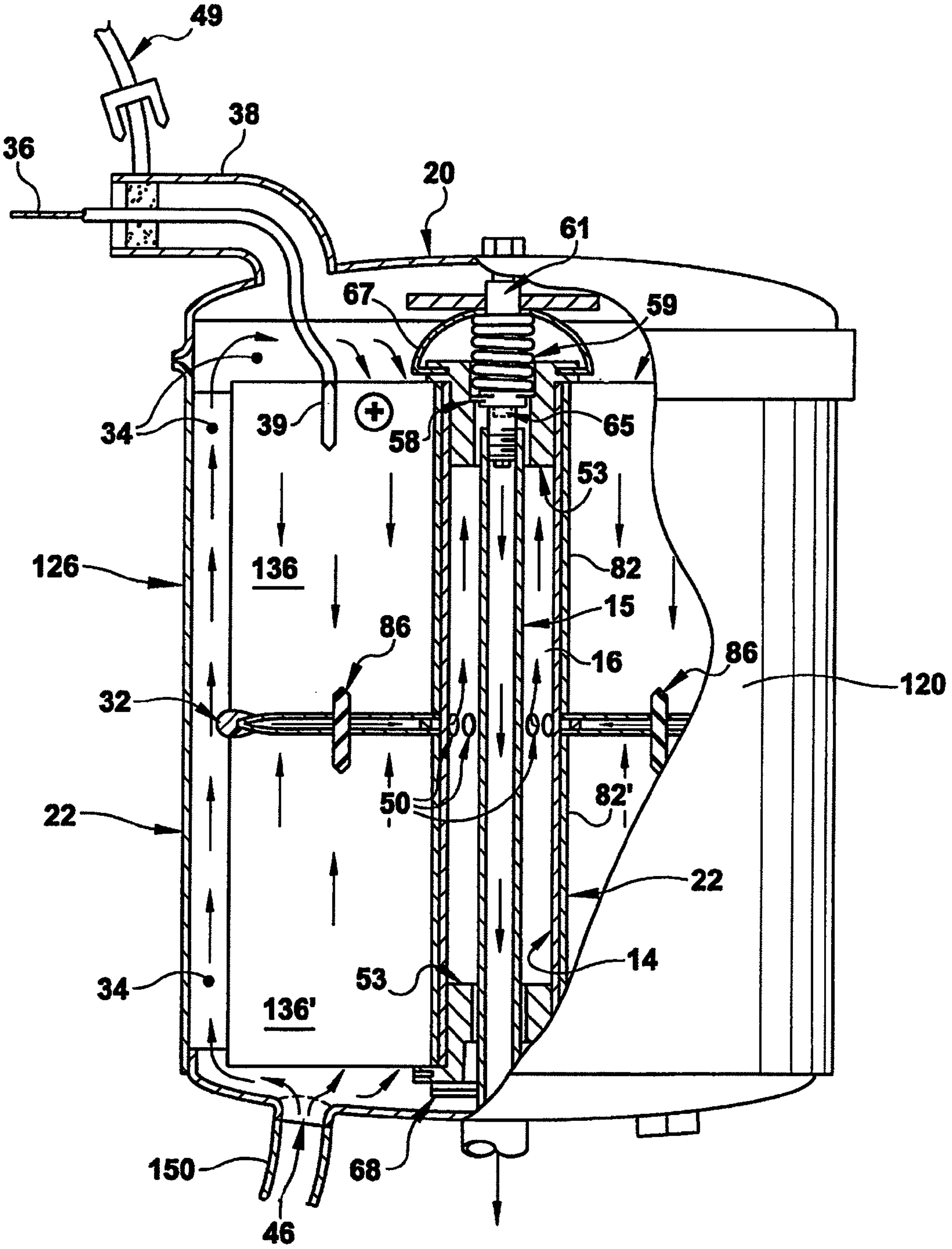
Figure 2C:
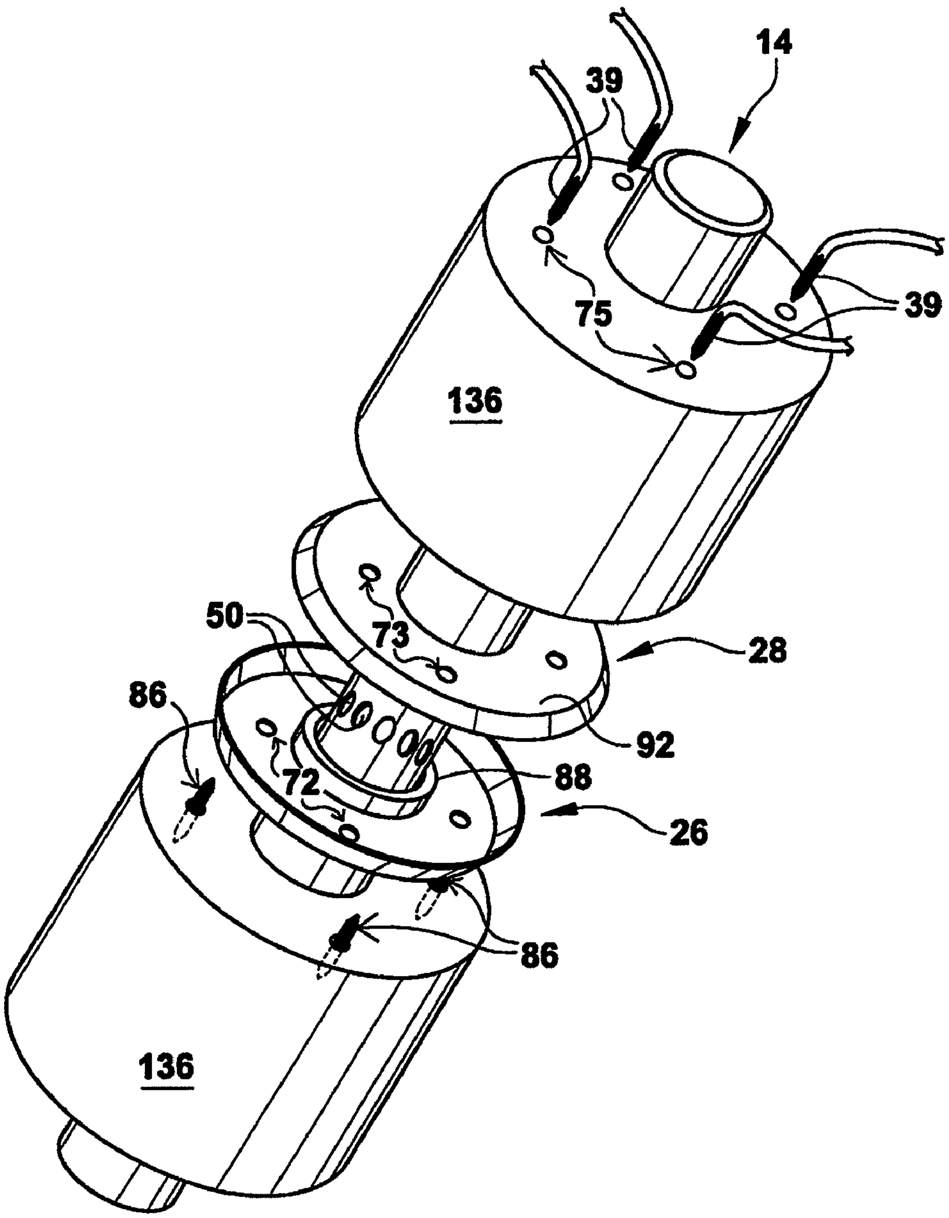

While it should be appreciated that various designs and configurations of the present filter tanks and filter elements may be implemented, FIGS. 2A-C illustrate a filter assembly in accordance with one or more embodiments of the invention. Referring to FIGS. 2A-C, each filter may be fabricated similar to the filters disclosed in U.S. Pat. No. 4,579,657, the disclosure of which is hereby incorporated herein in its entirety. For ease of understanding the invention, FIG. 2A shows a cross sectional schematic of one or more embodiments of an electrically enhanced cellulose filter system 100 of the invention. FIGS. 2B-C illustrate cross sectional views only of the positively charged filter tank 126 having one or more positively charged filter elements 136 therein. From this description of filter tank 126 in FIGS. 2B-C, it should be appreciated that the negatively charged filter tank is configured in a similar fashion and is oppositely charged to that of tank 126 with one or more negatively charged filter elements 134 and 134'.

Referring to FIGS. 2B-C, the positively charged filter tank 126 is encased by a cylindrical outer shell 120 that includes a dome section 20 compressed and tightly sealed to a canister section 22. Inside the canister section 22 of the tank 126 is a centrally located outer flow tube 14 and an inner flow tube 15 concentrically located therein. These outer and inner flow tubes 14 and 15 both extend generally along the length of one or more positively charged filter elements 136 and 136' residing in the canister section 22 of the tank 126. Similarly, outer and inner flow tubes 14 and 15 would also extend generally along the length of one or more negatively charged filter elements 134 and 134' residing within the canister section of the tank 124.

An axial passageway 16 extends along the length of the outer tube 14, between the outer and inner tubes 14 and 15, whereby a plurality of openings 50 are disposed and located on the outer tube 14, between planes made by a pair of annular discs 26 and 28. These plurality of openings 50 enable the fluid flow from the positively charged filter elements 136 and 136' into the axial passageway 16. Again, openings 50 would also reside within the outer tube of negatively charged filter tank 124 for fluid flow into its corresponding axial passageway 16. The inner tube 15 of each filter tank is open at a lower end thereof, such that, it is in fluid communication with the fluid storage tank 160. The opposite, upper end of the inner flow tube 15 of each filter tank extends near the top of the upper charged filter element 136 and 134 and has threads on its inner surface to receive a tightener screw 61. As depicted, the tightener screw 61 in each filter tank has an upper unthreaded part and a lower threaded part having a plurality of openings 65 therein. The fluid flows from the axial passageway 16, through openings 65 in the lower part of the tightener screw 61, into the inner flow tube 15, and out of each filter tank 126 and 124 into the fluid storage tank 160.

Each filter tank 126 and 124 includes a pair of plugs 53, whereby a plug 53 resides at each end of the outer tube 14 with a portion of each plug fitting tightly within the opposite ends of the outer tube 14. Each plug 53 also has a lip portion that extends over an outer surface of each positively charged filter element 136 and 136' and of each negatively charged filter elements 134 and 134' for supporting and maintaining these filter elements. The plugs 53 also aid in supporting and maintaining each outer flow tube 14 within filter tanks 126 and 124. A sealing material 62 of each plug 53, such as, a thermoplastic material, prevents filtered oil within the outer flow tube 14 from being contaminated by unfiltered oil in the fluid space 34 outside the filter elements.

The positively charged filter elements 136 and 136' and negatively charged filter element 134 and 134' all comprise spirally rolled filter media that are each concentrically wound around tubes 82, 82'. The filter media of these charged filter elements is preferably of a suitable weight paper (or tissue) rolled around cardboard tubes. While the filter paper may be any known type of filter paper, in one or more embodiments of the invention, the filter paper preferably comprises a cellulose filter paper. Further, the rolled filter paper may include a single layer of filter paper that is concentrically wound, or it may be a plurality of individual filter paper layers, laid one on top of the other, that are concentrically wound around tube 82 as a single concentrically rolled filter element.

In the present filter systems 100, the positively and negatively charged filter elements all have an equal number of spirally wound or rolled filter paper layers around the tubes 82. In this manner, the fluid flowing through systems 100 is filtered equally when passing simultaneously through the positively charged filter elements 136 and 136' and the negatively charged filter elements 134 and 134'.

Since the filter paper used to fabricate these concentrically rolled filter elements is generally a nonconductor, a surface of the filter paper is preferably treated to enhance the adsorbtion properties thereof. The enhancement of the filter paper surface increases its effectiveness in adsorbing charged contaminants from the fluid flow. Known techniques may be used to enhance the adsorbtion properties of the filter paper, either before the filter paper is concentrically rolled into the present filter elements or after such filter elements are formed. As discussed in more detail below, in addition to enhancing the paper's adsorbtive properties, the enhanced filter paper is also electrically activated to increase collection and removal of charged contaminates from the fluid flow including, but not limited to, charged sub-micron particles and/or oxidative matter.

Referring again to the assembly of the filter tanks, FIG. 2C shows the rolls of enhanced filter elements 136 and 136' mounted on the outer flow tube 14, whereby these two filter elements 136 and 136' are separated from one another by first and second spaced apart annular discs 26 and 28. An annular washer 88 resides between the disks 26 and 28 to provide the annular passageway 30 required for operation of one or more embodiments of the filter system 100. The disks 26 and 28 include flat annular regions 90 and 92 with centrally located openings therein for receiving the outer tube 14. The diameter of these centrally located openings in disks 26 and 28 are sufficiently larger than the diameter of outer flow tube 14 to ensure fluid flow through the openings 50 of outer tube 14 and into the axial passageway 16. The annular discs 26 and 28 are fluid pervious and are preferably formed from a corrosion resistant mesh including, but not limited to, wire, plastic, nylon, fiberglass mesh, an epoxy covered mesh, and the like. The discs allow axial flow of fluid from the electrically enhanced filter elements 136 and 136' into the annular passageway 30

Together, the filter elements 136 and 136', disks 26 and 28, washer 88, electrically conductive interconnect pins 86 and plugs 53, are fitted and secured onto the outer flow tube 14 to form a replaceable unit of the filter system 100. Referring to FIG. 2B, this replaceable unit also preferably includes a pivotable handle 67 attached to the top plug 53 for inserting and removing this replaceable filter unit into the canister section 22 of the filter tank 126. From the description of filter tank 126 in FIGS. 2B-C, it should be appreciated that filter tank 124 also has a replaceable unit that includes enhanced filter elements 134 and 134', disks 26 and 28, washer 88, electrically conductive interconnect pins 86 and plugs 53 all fitted and secured onto an outer flow tube 14 for insertion into tank 124.

In one or more embodiments, the replaceable filter unit may be fabricated by providing a first of the electrically enhanced filter elements 136 on the outer flow tube 14 (i.e., the lower filter element 136') followed by the first annular disc 26 and the second annular disc 28. The annular discs 26 and 28 are aligned with one another and fitted together. Preferably, these discs 26 and 28 are designed so that they engage and fit together, and do not extend past outer edges of the filter elements 136 and 136'.

One or more electrically conductive interconnect pins 86 are then inserted through both annular discs 26 and 28, preferably through openings in the mesh material thereof, so that a lower portion of the pins 86 contact the lower filter element 136' and an upper portion of the pins 86 reside outside of the top annular disc 28 for insertion into the upper filter elements 136. FIG. 2C shows an example of insertion markings 72 and 73 of locations where the pins 86 are inserted through annular discs 26 and 28, respectively. After the electrically conductive interconnect pins 86 are inserted into and contact the lower filter element 136', the second electrically enhanced filter element 136 (i.e., the upper filter element 136) is provided on the outer flow tube 14. In doing so, the upper portions of the pins 86 are inserted into this upper filter element 136 to provide the necessary electrical connection between the upper and lower filter elements 136 and 136'. These electrically conductive interconnect pins 86 are preferably of a rigid electrically conductive metal material.

A non-porous sealing material is then applied and provided to at least a portion of the filter elements 136 and 136' and the annular discs 26 and 28 to form an outer seal 32. This outer seal 32 extends between and around exterior radial edges of these components (i.e., 136, 136', 26 and 28 in tank 126; and 134, 134', 26 and 28 in tank 124) to prevent undesirable fluid flow communication between the annular passageway 30 and the fluid space 34 on the outside of filter elements 136 and 136'. In this manner, filtered fluid in the annular passageway 30 will not be contaminated by unfiltered fluid in the fluid space 34.

In providing the replaceable unit into the filter tank, the dome section 20 of the tank is first removed from the canister section 22, and then the replaceable unit is provided into the tank by fitting the outer flow tube 14 concentrically over the inner flow tube 15 until the bottom plug 53 of the replaceable unit is seated on a lower sealing disk 68 of the tank. Optionally, a spent replaceable unit may be removed from the canister prior to inserting a new replaceable unit therein.

Once the replaceable unit is provided over the inner flow tube 15, an upper sealing disk 58 is inserted into a countersunk portion of the upper plug 53. The replaceable unit is then secured and sealed inside the canister section 22 via the tightener screw 61, spring 59, washer and upper sealing disk 58. The spring 59 imparts a force on the replaceable unit so that the upper and lower sealing disks 58 and 68 are compressed against the surfaces with which they make contact to form leak-proof seals at opposite ends of the removable part.

One or more electrical connection spikes 39 are then inserted into at least the upper filter element 136 at various locations 75 across the top surface of this filter element 136, preferably after the replaceable unit is secured inside the canister section 22. The electrical connection spikes 39 are preferably of a rigid electrically conductive metal material that directly contacts the enhanced paper filter element for electrically activating such filter element to further enhance collection and removal of contaminants from the fluid flow. While the drawings show one or more electrical connection spikes 39 inserted into the upper filter element 136, it should be appreciated that one or more electrical connection spikes 39 may be inserted into the lower filter element 136', either alone or in combination with those spikes 39 inserted into the upper filter element 136.

These electrical connection spikes 39 are electrically connected to the power supply 110 via insulated electrical wiring 36, and are provided into the filter tank 126 through one or more openings residing in the dome section 20. For instance, the spikes 39 may include metal nail or pin-like structures that are welded to and are in electrical communication with the insulated wire. The insulated electrical wiring 36 is preferably held in position within the opening(s) of the dome section using a hydraulic seal that also prevents leakage of any fluid from the filter tank 126. Wherein the dome 20 only has one opening therein for receiving the electrical wiring and spike(s), all such wiring and spikes may be provided through this single opening and into the filter tank 126.

Once the electrical connection spikes 39 reside within at least one of the filter elements 136 and 136' of filter tank 126, and make direct physical contact with the filter paper therein, the dome section 20 is positioned over the canister section 22 and securely tightened thereto to form an entire leak-proof junction. Again, it should be appreciated that filter tank 124 is formed in the same manner as filter tank 126, and as such, includes identical components residing therein, with the difference of one filter tank being positively charged and the other filter tank being negatively charged. Each filter tank 126 and 124 itself of the present systems also include an earth grounded connection 49. That is, as shown in the drawings, each lid or dome 20 is separately earth grounded by an electrical connection 49 to provide electrostatically uniform field at the filter media. It also enhances performance of the present system. Each canister section 22 is also earth grounded by virtue of the piping that is connected to the pump and motor, which are connected to earth ground. Further, inner flow tube 15, which is preferably a metal pipe, is entirely insulated and electrically isolated from the earth grounded piping of canister section 22.

Figure 3A:
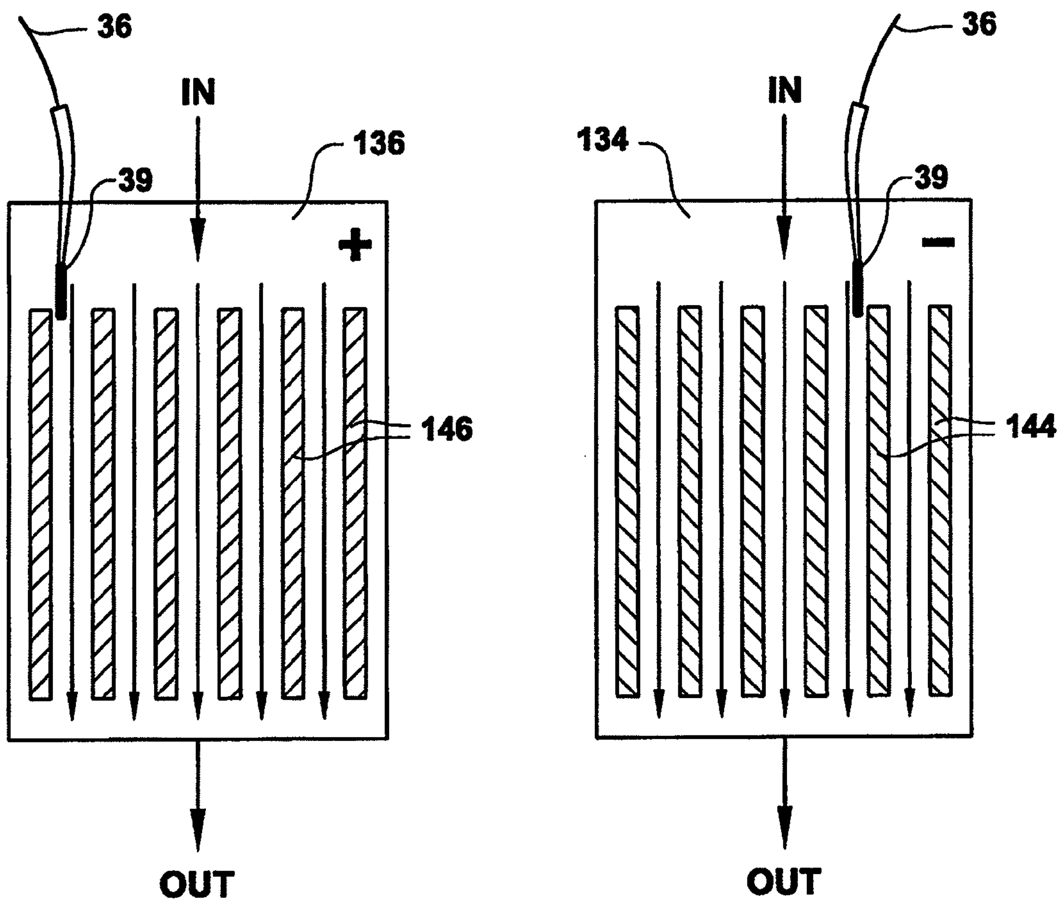
FIGS. 3A-B show a cross sectional view of the filter media and fluid flow within filter elements of one or more embodiments of the invention.
Figure 3B:
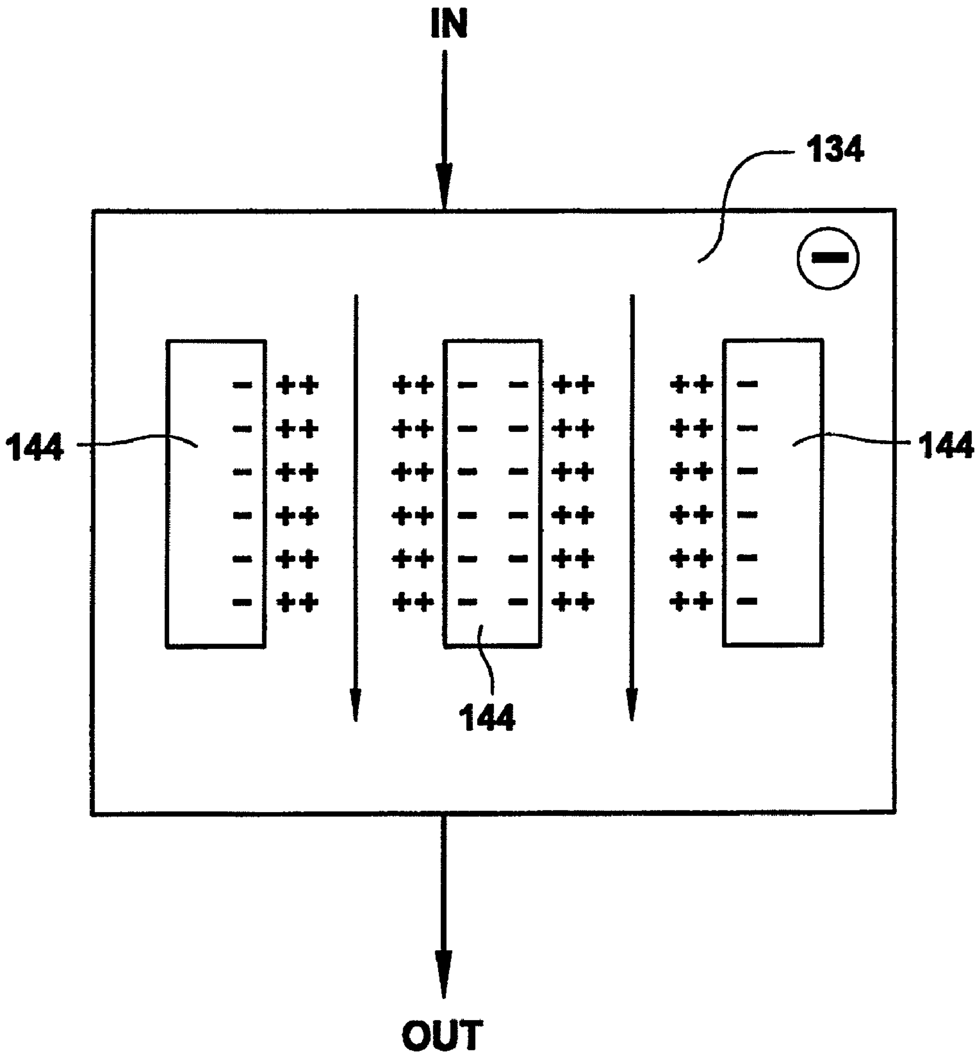

Referring to FIGS. 3A-B, during operation of the present filter systems 100, an earth grounded positive control voltage 116 is supplied from power supply 110 to the positively charged filter tank 126 through the one or more insulated electrical wirings 36 and corresponding electrical connection spikes 39. At the same time, an earth grounded negative control voltage 114 is supplied from the power supply 110 to the negatively charged filter tank 124 through one or more insulated electrical wirings 36 and corresponding electrical connection spikes 39. These electrical spikes 39 are provided at a top surface of the positively and negatively charged filter elements, whereby the voltage from the spikes 39 is carried throughout the entire continuous, concentrically wound filter element. Further, wherein upper and lower filter elements 136 and 136' are provided, the electrically conductive interconnect pins 86 provide the necessary electrical connection between such filter elements 136 and 136' within the filter tanks. These positively charged filter element and negatively charged filter element have uniform voltages.

Once the system is turned on, the fluid is pumped from the fluid storage 160 and flows through the insulated piping 150, whereby equal volumes of fluid flow are simultaneously input into the positively 126 and negatively 124 charged filter tanks via ports 46 at the outer shells 120. The contaminated fluid then flows through the fluid space 34 on the outside of the respective filter elements (i.e., outside elements 136 and 136' of filter tank 126, and outside elements 134 and 134' of filter tank 124). Equal amounts of contaminated fluid flows concurrently into the positively 126 and negatively 124 charge filter tanks for simultaneous filtering therein.

In filtering using the present systems 100, the contaminated fluid flows parallel to the surfaces of the concentrically wound filter paper as shown in FIG. 3A. These surfaces of the concentrically wound filter paper form channels between adjacent surfaces of the wound filter paper. These channels have relatively small diameters ranging from about 3 microns to about 10 microns, preferably from about 5 microns to about 10 microns. The electrical connection spike(s) 39 contact the filter paper of filter element 136 and/or 136', and provide a positive charge thereto that is biased to earth ground, thereby holding such filter element itself positive with respect to ground. At the same time, other electrical connection spike(s) 39 contact the filter paper of filter element 134 and/or 134' with a negative charge that is biased to earth ground, such that, these filter element(s) are negative with respect to ground. The power supply 110 provides these initially fixed low positive and negative voltages.

Again, the contaminated fluid flows through these small channels between adjacent surfaces of the wound filter paper, such that, it flows parallel to the electrically charged surfaces of such paper. In doing so, as the fluid flows through the system 100, and through these tight channels, triboelectric charges are generated as a result of contact friction between the fluid and components of the system. These triboelectric charges are built up on the filter media itself to further charge surfaces of the filter media to a more positive or negative charged state. That is, as the fluid flows through the channels and makes contact with such channels, triboelectric charge separations from the fluid flow move the charged filter elements 136 and 134 either toward a more positive or negative voltage, depending upon the initial voltage applied to such filter element (i.e., whether it is initially provided with a low positive or negative voltage.) These electrical activation triboelectric forces also charge particles within the fluid flow itself, either positively or negatively, which leads to the undesirable build up static electricity causing contamination of the fluid flow by very fine charged particles. These very fine charged particles may have diameters of less than about 3 to 10 microns, preferably less than about 3 to 5 microns and even smaller.

The present systems 100 solve this contamination problem of very fine charged particles by electrostatically containing and removing such fine charged particles from the fluid flow. In doing so, the combination of the electrical charges from spikes 39 and these triboelectric charges from the fluid flow transform the non-conductive starting filter media material into concentrically wound, electrically charged filter elements 136 and 134 of semi-conducting media having conductivity greater than about 50,000 pS/M. Each filter element 136 and 134 has electrical continuity from a top surface of such filter element all the way down to a bottom surface thereof. Moreover, wherein both upper and lower filter elements 136 and 136' are provided, the conductive interconnect pins 86 that electrically connect these two filter elements to one another, such that, electrical continuity is provided from a top surface of the upper filter element all the way down to the bottom surface of the lower filter element. Again, in one or more embodiments of the invention, the lower filter element 136' may be provided with one or more electrical spikes 39 to enhance the conductivity of such lower filter element.

The combination of these electrically enhanced filter elements 136, 136', 134 and 134', which are biased with respect to ground, and the electrical activation forces induced on the charged contaminating particles attract a significantly large portion of such contaminating material to the surface of the filter elements from the fluid flowing parallel through these induced channels. These contaminating particles form an electrical double layer at the surface of the filter elements 136, 136', 134 and 134' within these channels, thereby removing contaminates having an opposite electrical charge to that of the charged filter elements while forcing those contaminates having the same electrical charge as that of the charged filter elements to the center of the channels for passing through and out the filter.

For instance, referring to FIG. 3B, negatively charged filter element 134 is shown whereby the filter paper has a negative charge biased to ground. The electrical double layer includes a first layer of a positive surface charge that coincides with each surface of the negatively charged paper and a second diffuse layer of positively charged particles within the fluid flow that screens the first layer. Together these first and second layers of positively charged particles form the double layer, whereby negatively charged particulates are forced to the center of the channels and pass through and out the filter. Through the one or more electrical spikes 39 that are in contact with the electrically enhanced filter elements, the power supply 110 controls the voltages allowed to accumulate within each filter tank 126 and 124. Again, these built up voltages include those voltages resulting from the triboelectric charges and forces in the filter tanks as discussed in detail above. In controlling the voltages of the filter tanks, the variable resistors of the power supply sense the current going into each filter tank and feed this data back to the power supply. The power supply uses this feedback data to correct for any undesired voltage excesses or shortfalls within each filter tank 126 and 124 by adjusting the output voltages applied to each filter tank 126 and 124 so that these filter tanks perform under equivalent operating conditions with opposite electrical charges applied thereto.

After the fluid flow has been filtered through the filter elements, the filtered fluid flows through the annular discs 26 and 28, into an annular passageway between such discs, through the plurality of openings 50 located on the outer tube 14 and into the axial passageway 16. The filtered fluid flows into the inner tube 15, which is in fluid communication with the fluid storage tank, and out of the filter tank toward the fluid storage tank 160. The inner tube 15 may be a part of the insulating piping 150 that the fluid flow travels through, or it may be an extension thereof that is securely connected (e.g., by welding) to the piping 150.

Accordingly, unlike conventional approaches of electrostatic filtering that charge and/or filter both positive and negative particles in a single chamber resulting in electrostatic imbalances in the resultant filtered fluid, as well as cause agglomeration and/or flocculation of particles within the fluid flow, the present systems 100 avoid any electrostatic imbalances in the filtered fluid flowing there-from, and as such, avoid the need for filtering out both agglomerates and/or flocculated particles. This is accomplished by the present systems 100 both charging and filtering positively charged contaminants in one chamber, and in a separate electrically isolated chamber, simultaneously charging and filtering negatively charged contaminants. In doing so, an unbiased fluid flow is returned from the two separate filter tanks 126 and 124. That is, since the positively charged filter tank 126 removes only negatively charged particles, and the negatively charged filter tank 124 removes only positively charged particles, the filtered fluid flowing from tank 126 has a positive bias that is negated by the negative bias flowing from tank 124. The result is a filtered fluid having balanced electrostatic charges therein. Through the random mixing of the filtered fluid in system 100, along with any unfiltered charges therein, these previously unfiltered charges will be removed via one or more subsequent passes of the filter flow through filter tanks 126 and 124.

Figure 5A:
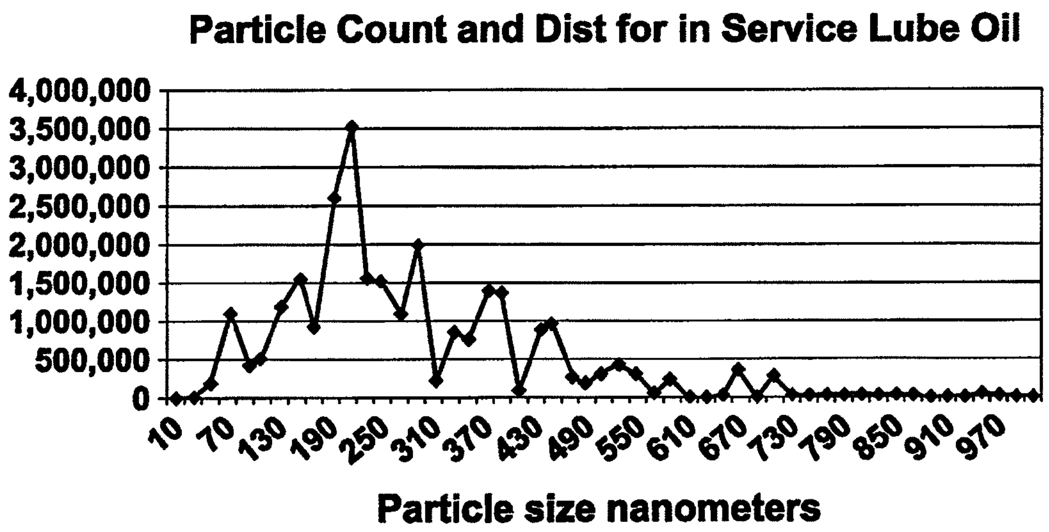
FIGS. 5A-B show graphs illustrating the contamination comparison between non-filtered fluid against fluid that has been filtered using the electrically enhanced cellulose filter systems and methods of the invention.
Figure 5B:
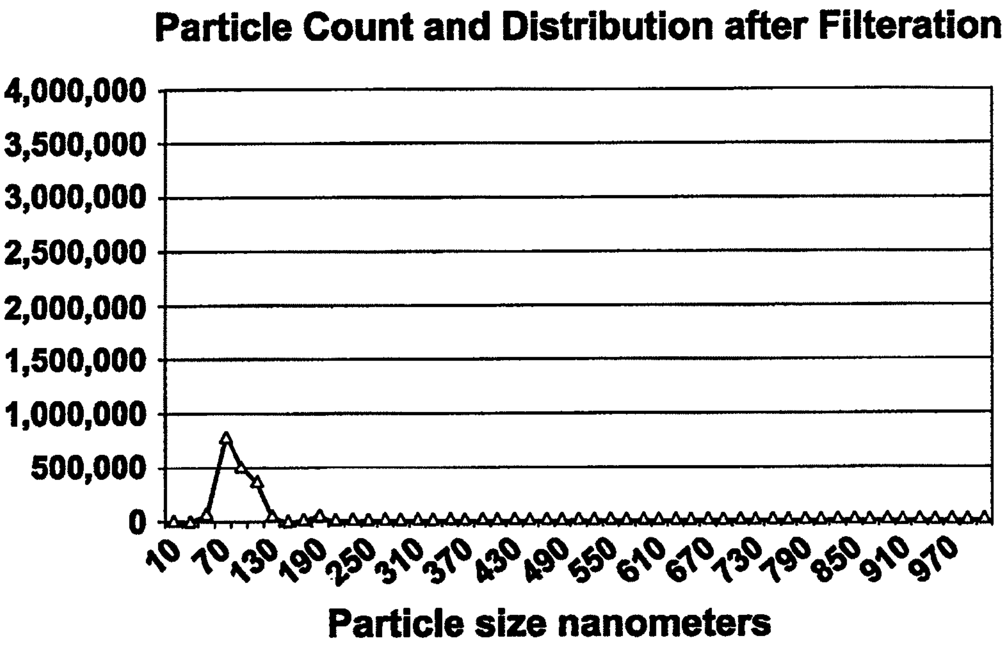

FIGS. 5A and 5B are comparative charts showing the results of filtering a fluid flow in accordance with the one or more embodiments of the invention. FIG. 5A illustrates the amounts of various sized contaminating charged particles residing within the fluid flow prior to filtering in accordance with the invention. As is shown, prior to filtration, the fluid is contaminated with numerous particles having various sized diameters. However, after filtration using the present system 100, the observed elimination of charged contaminants in accordance with the various embodiments of the invention is down to 90 nm, or even less. In addition to the electrostatic removal of these very fine particles, the filter systems 100 continue to act as mechanical filters in trapping and removing larger sized contaminants from the fluid flow, such as, those having diameters greater than 10 microns.

Figure 4:
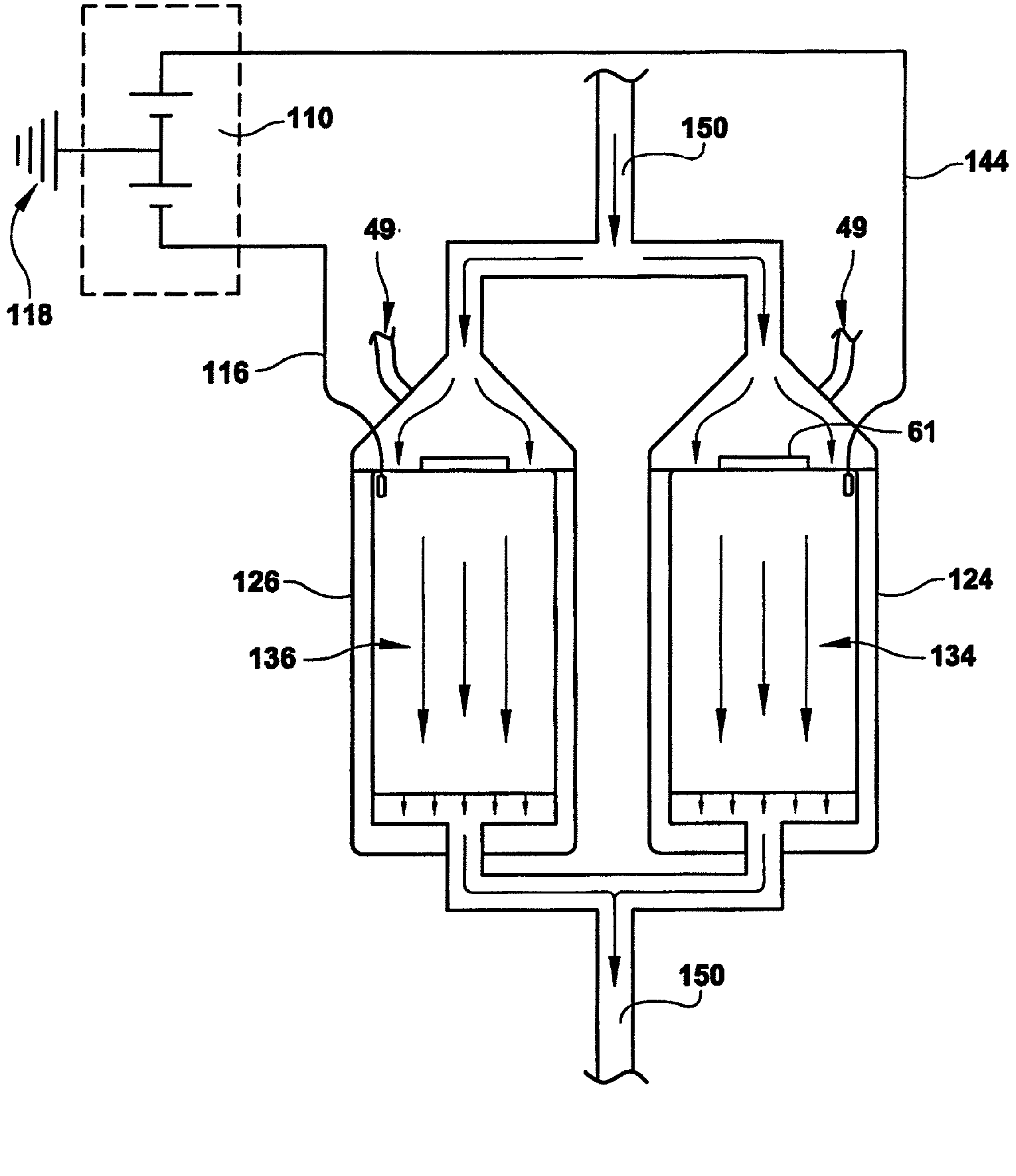
FIG. 4 shows a cross sectional view of another electrically enhanced cellulose filter system in accordance with one or more embodiments of the invention.

While not departing from the novel concepts of the invention, it should be appreciated that the present system is not limited to the filter tanks 126 and 124 each having a pair of filter elements 136, 136' and 134, 134', respectively, therein. Referring to FIG. 4, it should be appreciated and understood in accordance with the description of the present invention that the present systems 100 may include filter tanks 126 and 124 having one or more charged filter elements 136 and 134 therein, respectively. In these various embodiments of the invention, the positively charged filter tank 126 may have a single electrically enhanced filter element 136 of the invention, while the negatively charged filter tank 124 has a single electrically enhanced filter element 134 therein. An essential feature of the invention is that these filter elements of FIG. 4 are positively and negatively charged with respect to ground in accordance with the invention, and the built up voltages therein are controlled and adjusted by the power source 110 to ensure that the fluid flowing through these two tanks 126 and 124 is simultaneously processed under the same operating conditions with oppositely charged voltages applied thereto to generate an unbiased treated filter flow return, as discussed in detail above. While still not departing from the concepts of the invention, these filter tanks 126 and 124 may be provided with more than two filter elements therein, whereby each of these filter elements in their respective filter tanks 126 and 124 are in electrical communication with one another via one or more electrically conductive interconnect pins 86 as described in connection with FIG. 2B.

The present electrically enhanced filter systems 100 of the invention are easy and safe to handle and use, dependable, economical, durable and fully effective in accomplishing its intended purposes. They are also adaptable for quick and easy attachment to the components of an existing fluid system of the invention to facilitate the replacement of a used filter by a new one. It will be appreciated from the foregoing description of the invention, that these electrically enhanced filter systems 100 can be constructed in a variety of forms for use in numerous differing fluid systems, such as hydraulic and other insulating and/or dielectric fluid systems, lubrication systems, and the like in vehicles or machinery.

While the present invention has been particularly described, in conjunction with one or more preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An electrostatic filter having a fluid flow therein comprising:

an earth grounded power supply;

a first filter tank having therein a first flow tube and a positively charged filter element, said positively charged filter element comprising a first positively charged filter media separated from a second positively charged filter media by a pair of annular discs spaced apart from one another to form an annular passageway for fluid flow within said first filter tank;

a plurality of conductive interconnect pins extending through said pair of annular discs and electrically connecting said first positively charged filter media to said second positively charged filter media, each of the plurality of conductive interconnect pins having a length that allows each said pin to extend through and beyond each annular disc so that a lower portion of each said pin contacts and ends within the first positively charged filter media a distance away from a bottom of the positively charged filter element and an upper portion of each said pin contacts and ends within the second positively charged filter media a distance away from a top of the positively charged filter element;

a first electrical connector extending into and contacting at least one of the positively charged filter media, the first electrical connector connected to the earth grounded power supply and in direct contact with the at least one of the positively charged filter media for controlling positive charges to said positively charged filter element;

a second filter tank having therein a second flow tube and a negatively charged filter element that is electrically isolated from said positively charged filter element, said negatively charged filter element comprising a first negatively charged filter media separated from a second negatively charged filter media by another pair of annular discs spaced apart from one another to form another annular passageway for fluid flow within said second filter tank;

a plurality of other conductive interconnect pins extending through said another pair of annular discs and electrically connecting said first negatively charged filter media to said second negatively charged filter media, each of the plurality of other conductive interconnect pins having a length that allows each said pin to extend through and beyond each annular disc so that a lower portion of each said pin contacts and ends within the first negatively charged filter media and an upper portion of each said pin contacts and ends within the second negatively charged filter media;

a second electrical connector extending into and contacting at least one of the negatively charged filter media, the second electrical connector connected to the earth grounded power supply and in direct contact with at least one of the negatively charged filter media for controlling negative charges to said negatively charged filter element; and an electrical connection between the earth grounded power supply and said first and second electrical connectors for monitoring and adjusting voltages applied to said positively and negatively charged filter elements for resulting in a combined discharge of an unbiased fluid flow from said first and second filter tanks.

2. The filter of claim 1 wherein both said positively charged filter media and said negatively charged filter media comprise concentrically rolled filter media.

3. The filter of claim 2 wherein said concentrically rolled filter media comprises at least one layer of filter paper having enhanced adsorbtion properties spirally rolled around a tube.

4. The filter of claim 3 wherein said filter paper comprises cellulose filter paper.

5. The filter of claim 1 wherein each of said plurality of conductive interconnect pins have pointed ends at both said lower and upper portions residing within said positively charged filter media and said negatively charged filter media.

6. The filter of claim 1 wherein said first flow tube, said first and second positively charged filter elements, said pair of annular discs, and said one or more conductive interconnect pins, together, form a replaceable filter unit of said first filter tank.

7. The filter of claim 1 wherein said second flow tube, said first and second negatively charged filter elements, said another pair of annular discs, and said one or more other conductive interconnect pins, together, form a replaceable filter unit of said second filter tank

8. The filter of claim 1 further comprising:

a plurality of positively charged filter elements residing on said first flow tube, each separated from one another by a plurality of pairs of annular discs and electrically connected to one another by a plurality of conductive interconnect pins; and a plurality of negatively charged filter elements residing on said second flow tube, each separated from one another by another plurality of pairs of annular discs and electrically connected to one another by another plurality of conductive interconnect pins.

9. An electrostatic filter system for removing particles from a fluid comprising:

an earth grounded power supply, the power supply having an earth grounded positive voltage control and an earth grounded negative voltage control;

a first filter tank containing a first flow tube and at least first and second positively charged filter media, adjacent said positively charged filter media separated from each other by annular discs spaced apart from one another to form an annular passageway for fluid flow within said first filter tank;

a plurality of equidistantly spaced conductive interconnect pins extending through said annular discs and electrically connecting said adjacent positively charged filter media to each other, each of the plurality of conductive interconnect pins having a length that allows each said pin to extend through and beyond each annular disc so that a lower portion of each said pin contacts and ends within the first positively charged filter media and an upper portion of each said pin contacts and ends within the second positively charged filter media;

a plurality of positively charged connectors extending into and contacting at least one of the positively charged filter media, each of said positively charged connectors connected to the earth grounded power supply and in direct contact with said positive control voltage of said power supply and at least one of said positively charged filter media, said plurality of positively charged connectors residing in locations corresponding to said plurality of equidistantly spaced conductive interconnect pins and controlling positive charges to said positively charged filter media while said conductive interconnect pins pass said positive charges to said adjacent positively charged filter media;

a second filter tank containing a second flow tube and at least first and second negatively charged filter media elements that are electrically isolated from said positively charged filter media, adjacent said negatively charged filter media separated from each other by other annular discs spaced apart from one another to form other annular passageway for fluid flow within said second filter tank;

a plurality of equidistantly spaced other conductive interconnect pins extending through said other annular discs and electrically connecting said adjacent negatively charged filter media to each other, each of the plurality of other conductive interconnect pins having a length that allows each said pin to extend through and beyond each annular disc so that a lower portion of each said pin contacts and ends within the first negatively charged filter media and an upper portion of each said pin contacts and ends within the second negatively charged filter media;

a plurality of negatively charged connectors extending into and contacting at least one of the negatively charged filter media, each of said negatively charged connectors connected to the earth grounded power supply and in direct contact with said negative control voltage of said power supply and at least one of said negatively charged filter media, said plurality of negatively charged connectors controlling negative charges to said negatively charged filter media while said other conductive interconnect pins pass said negative charges to said adjacent negatively charged filter media; and resistors of said earth grounded power supply for monitoring and adjusting voltages applied to said positively and negatively charged filter media for resulting in a combined discharge of an unbiased fluid flow from said first and second filter tanks.

10. The system of claim 9 wherein said positively and negatively charged filter media each comprise a concentric roll of filter media.

11. The system of claim 10 wherein each concentric roll of filter media has parallel channels between adjacent surfaces thereof, such that, said fluid flows through said parallel channels generating triboelectric charges that build up on said adjacent surfaces and remove charged particles from said fluid for resulting in said unbiased fluid flow from said first and second filter tanks.

12. The system of claim 11 wherein said channels have diameters ranging from about 3 microns to about 10 microns.

13. The system of claim 9 wherein each of said plurality of conductive interconnect pins have pointed ends at both said lower and upper portions residing within said positively charged filter media and said negatively charged filter media.

14. The system of claim 9 wherein said resistors comprise a first variable resistor in a load return line of said earth grounded positive voltage control and a second variable resistor in a load return line of said earth grounded negative voltage control.

15. The filter of claim 1 wherein said first and second positively charged filter media are positively charged relative to earth ground, and said first and second negatively charged filter media are negatively charged relative to earth ground.

16. The filter of claim 1 wherein a first electrical connector and the second electrical connector are first and second electrically connective spikes having pointed ends, respectively.

17. The filter of claim 1 wherein said annular discs comprise a corrosion resistant mesh material.

18. The filter of claim 17 wherein said mesh material is selected from the group consisting of wire, plastic, nylon, fiberglass mesh, and an epoxy covered mesh.

19. The filter of claim 1 wherein said first and second positively charged filter media comprise electrically activated filter paper.

20. The filter of claim 19 wherein said first and second negatively charged filter media comprise electrically activated filter paper.

* * * * *